(12) United States Patent
Wang et al.

(10) Patent No.: US 11,907,415 B2
(45) Date of Patent: Feb. 20, 2024

(54) METHOD, ELECTRONIC DEVICE, AND NON-TRANSITORY COMPUTER READABLE STORAGE MEDIUM FOR INTERACTING WITH VIRTUAL REALITY ENVIRONMENT

(71) Applicant: HTC Corporation, Taoyuan (TW)

(72) Inventors: Ying-Jing Wang, Taoyuan (TW);
Fang-Ju Lin, Taoyuan (TW);
Yun-Jung Lee, Taoyuan (TW);
Yu-Chien Huang, Taoyuan (TW);
Kuan-Yi Lien, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/151,480

(22) Filed: Jan. 9, 2023

(65) Prior Publication Data

US 2023/0273675 A1   Aug. 31, 2023

Related U.S. Application Data

(60) Provisional application No. 63/313,732, filed on Feb. 25, 2022.

(51) Int. Cl.
*G06F 3/04845* (2022.01)
*G06F 3/01* (2006.01)
*G06F 3/04812* (2022.01)
*G06F 3/04817* (2022.01)

(52) U.S. Cl.
CPC .......... *G06F 3/011* (2013.01); *G06F 3/04812* (2013.01); *G06F 3/04817* (2013.01); *G06F 3/04845* (2013.01)

(58) Field of Classification Search
CPC .. G06F 3/011; G06F 3/04812; G06F 3/04817; G06F 3/04845; G06F 3/017; G06F 3/04815; G06F 3/04842; G06F 3/0486
See application file for complete search history.

(56) References Cited

U.S. PATENT DOCUMENTS

| | | | |
|---|---|---|---|
| 11,032,536 B2* | 6/2021 | Lutter | H04N 19/162 |
| 11,334,212 B2* | 5/2022 | Ravasz | G06V 40/20 |
| 2012/0290966 A1* | 11/2012 | Chae | G06F 3/0481 |
| | | | 715/778 |
| 2017/0228931 A1* | 8/2017 | Parker | G02B 27/017 |
| 2019/0005717 A1* | 1/2019 | Singh | G06T 15/80 |
| 2021/0178264 A1* | 6/2021 | Azmandian | A63F 13/53 |
| 2022/0179610 A1* | 6/2022 | Trim | G06F 1/1647 |

* cited by examiner

*Primary Examiner* — Rodney Amadiz
(74) *Attorney, Agent, or Firm* — JCIPRNET

(57) ABSTRACT

A method, an electronic device, and a non-transitory computer readable storage medium for interacting with a virtual reality (VR) environment are provided. The method includes: displaying a first portal in a first virtual scene of the virtual reality environment, wherein the first portal is for a virtual scene switching, and the first portal comprises a frame; determining whether the frame is dragged toward a center of the first portal; and in response to determining the frame is dragged toward the center of the first portal, removing the first portal from the virtual reality environment.

16 Claims, 10 Drawing Sheets

METHOD, ELECTRONIC DEVICE, AND NON-TRANSITORY COMPUTER READABLE STORAGE MEDIUM FOR INTERACTING WITH VIRTUAL REALITY ENVIRONMENT

CROSS-REFERENCE TO RELATED APPLICATION

This application claims the priority benefit of U.S. Provisional Patent Application Ser. No. 63/313,732, filed on Feb. 25, 2022. The entirety of the above-mentioned patent application is hereby incorporated by reference herein and made a part of this specification.

BACKGROUND

Technical Field

The disclosure relates to a method for virtual reality (VR) technology, and particularly relates to a method, an electronic device, and a non-transitory computer readable storage medium for interacting with a VR environment.

Description of Related Art

Along with the improvement of technology, VR head mounted devices become more and more popular. A VR head mounted device may create a VR environment for the user, and the user may interact with a virtual object (e.g., a virtual button) in a virtual scene provided by the VR environment. If the VR environment can provide a plurality of virtual scenes for the user to interact, it can make the user experience much more enjoyable. Accordingly, how to provide easy way for the user to interact with the plurality of virtual scenes is an important topic in the art.

SUMMARY

The disclosure is directed to a method, an electronic device, and a non-transitory computer readable storage medium for interacting with a VR environment.

The present invention is directed to a method for interacting with a virtual reality environment, including: displaying a first portal in a first virtual scene of the virtual reality environment, wherein the first portal is for a virtual scene switching, and the first portal includes a frame; determining whether the frame is dragged toward a center of the first portal; and in response to determining the frame is dragged toward the center of the first portal, removing the first portal from the virtual reality environment.

The present invention is directed to an electronic device for interacting with a virtual reality environment, wherein the electronic device includes a transceiver and a processor. The transceiver outputs a first virtual scene of the virtual reality environment. The processor coupled to the transceiver, wherein the processor is configured to: display a first portal in the first virtual scene, wherein the first portal is for a virtual scene switching, and the first portal includes a frame; determine whether the frame is dragged toward a center of the first portal; and in response to determining the frame is dragged toward the center of the first portal, remove the first portal from the virtual reality environment.

The present invention is directed to a non-transitory computer readable storage medium for interacting with a virtual reality environment. The non-transitory computer readable storage medium records an executable computer program to be loaded by an electronic device to execute steps of: displaying a first portal in a first virtual scene of the virtual reality environment, wherein the first portal is for a virtual scene switching, and the first portal includes a frame; determining whether the frame is dragged toward a center of the first portal; and in response to determining the frame is dragged toward the center of the first portal, removing the first portal from the virtual reality environment.

Based on the above description, the present invention provides a convenience way for the user to remove the portal from the VR environment.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
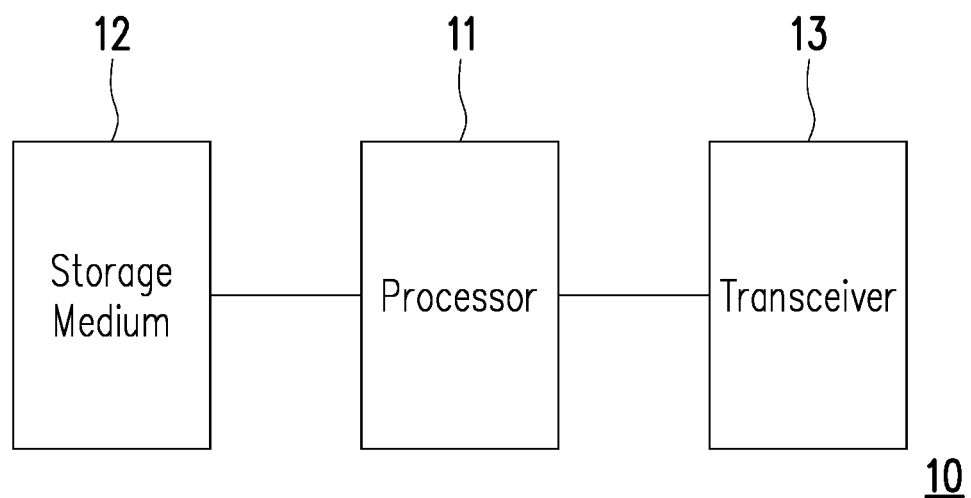
FIG. 1 illustrates a schematic diagram of an electronic device for interacting with a VR environment according to one embodiment of the present invention.

FIG. 1 illustrates a schematic diagram of an electronic device 10 for interacting with a VR environment according to one embodiment of the present invention. The electronic device 10 may be used for interacting with an extended reality environment such as a VR environment, an augmented reality (AR) environment, or a mixed reality (MR) environment. The electronic device may include a processor 11, a storage medium 12, and a transceiver 13.

The processor 11 is, for example, a Central Processing Unit (CPU), or other programmable general purpose or special purpose Micro Control Unit (MCU), a microprocessor, a Digital Signal Processor (DSP), a programmable controller, an Application Specific Integrated Circuit (ASIC), a Graphics Processing Unit (GPU), an Arithmetic Logic Unit (ALU), a Complex Programmable Logic Device (CPLD), a Field Programmable Gate Array (FPGA) or other similar device or a combination of the above devices. The processor 11 may be coupled to the storage medium 12 and the transceiver 13.

The storage medium 12 may be, for example, any type of fixed or removable random access memory (RAM), a read-only memory (ROM), a flash memory, a hard disk drive (HDD), a solid state drive (SSD) or similar element, or a combination thereof. The storage medium 12 may be a non-transitory computer readable storage medium configured to record a plurality of executable computer programs, modules or applications to be loaded by the processor 11 to perform the functions of the electronic device 10.

The transceiver 13 may configured to transmit or receive wired/wireless signals. The transceiver 13 may also perform operations such as low noise amplifying, impedance matching, frequency mixing, up or down frequency conversion, filtering, amplifying, and so forth. The processor 11 may provide a VR (or AR, MR) environment for the user by outputting the data of the VR (or AR, MR) environment via the transceiver 13. For example, the processor 11 may output the data of the VR environment to a head mounted device (HMD) via the transceiver 13 such that the HMD may show a virtual scene of the VR environment according to the received data.

Figure 2:
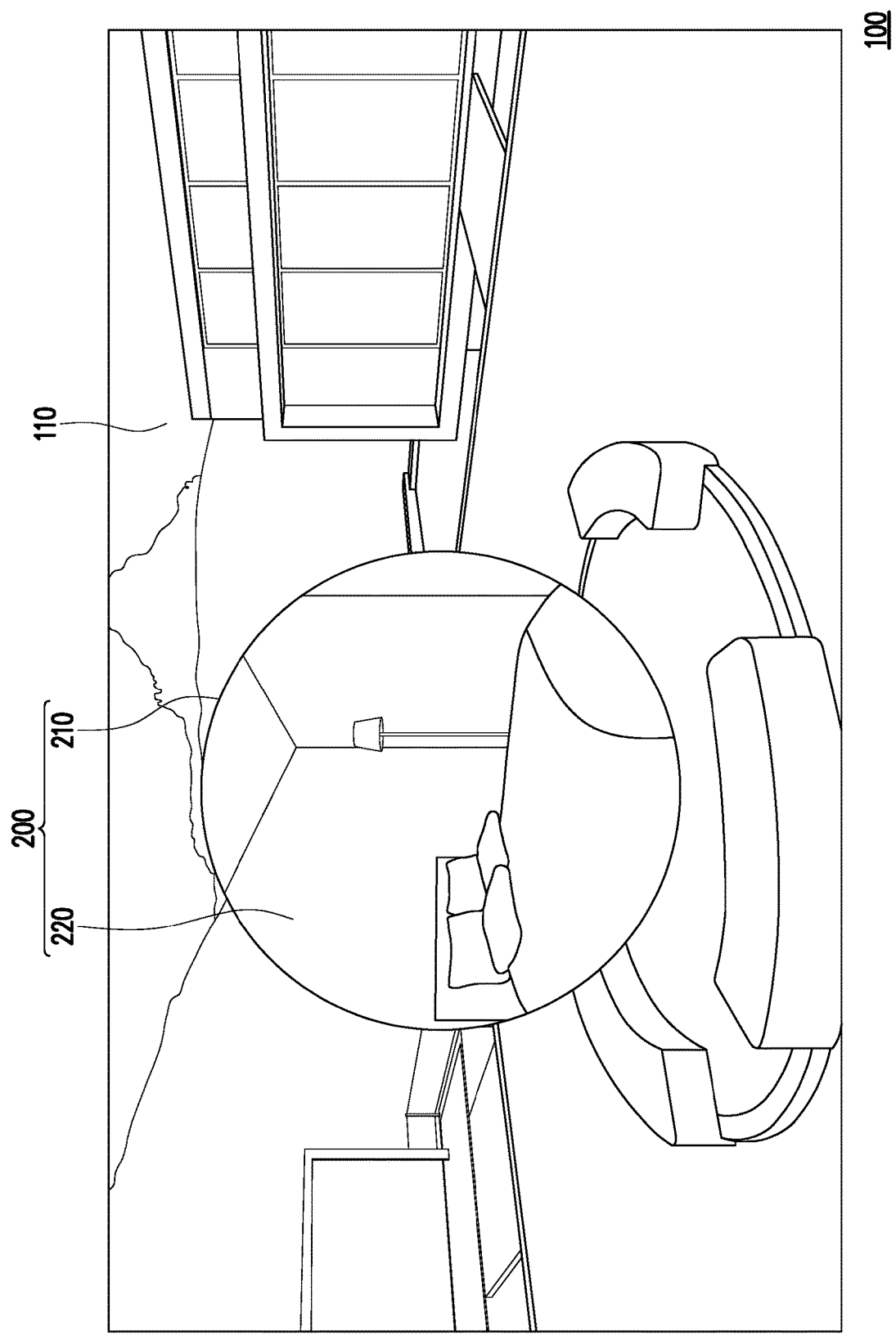
FIG. 2 illustrates a schematic diagram of the portal associated with a specific virtual scene according to one embodiment of the present invention.

A VR environment may provide one or more virtual scenes for the user to explore. When the VR environment provides a plurality of virtual scenes to be explored, the user may perform a destination selection of virtual scenes. FIG. 2 illustrates a schematic diagram of the portal 200 associated with a specific virtual scene according to one embodiment of the present invention. It is assumed that the VR environment is providing a virtual scene 110 currently. If the user wants to switch the VR environment 100 from the virtual scene 110 to another virtual scene, the processor 11 may receive a command from a user operation through the transceiver 13, and the processor 11 may obtain and display the portal 200 in the virtual scene 110 according to the command.

The portal 200 is a graphical user interface (GUI) in the virtual scene 110, wherein the GUI may be manipulated by a user to perform a virtual scene switching. The portal 200 may include a frame (or border, boundary, edge, ring) 210 and a preview area 220, wherein the frame may be an image corresponding to a part of the virtual scene at a specific time point. Though the shape of the frame 210 is circular in FIG. 2, the frame 210 may have different kinds of shapes. For example, the shape of the frame 210 can be oval or rectangular.

The preview area 220 is surrounded by the frame 210. In response to the portal 200 being displayed in the virtual scene 110, the processor 11 may display a preview image of a candidate destination (i.e., another virtual scene) within the preview area 220. For example, the processor 11 may display a preview image of a virtual scene corresponding to a "virtual room", as shown in FIG. 2. That is, the portal 200 in FIG. 2 may be associated with the virtual scene corresponding to the "virtual room". Accordingly, if the processor 11 receives a command corresponding to the portal 200, the processor 11 may switch the VR environment 100 from the virtual scene 110 to another virtual scene corresponding to the "virtual room" (i.e., another virtual scene corresponding to the portal 200).

Figure 3:
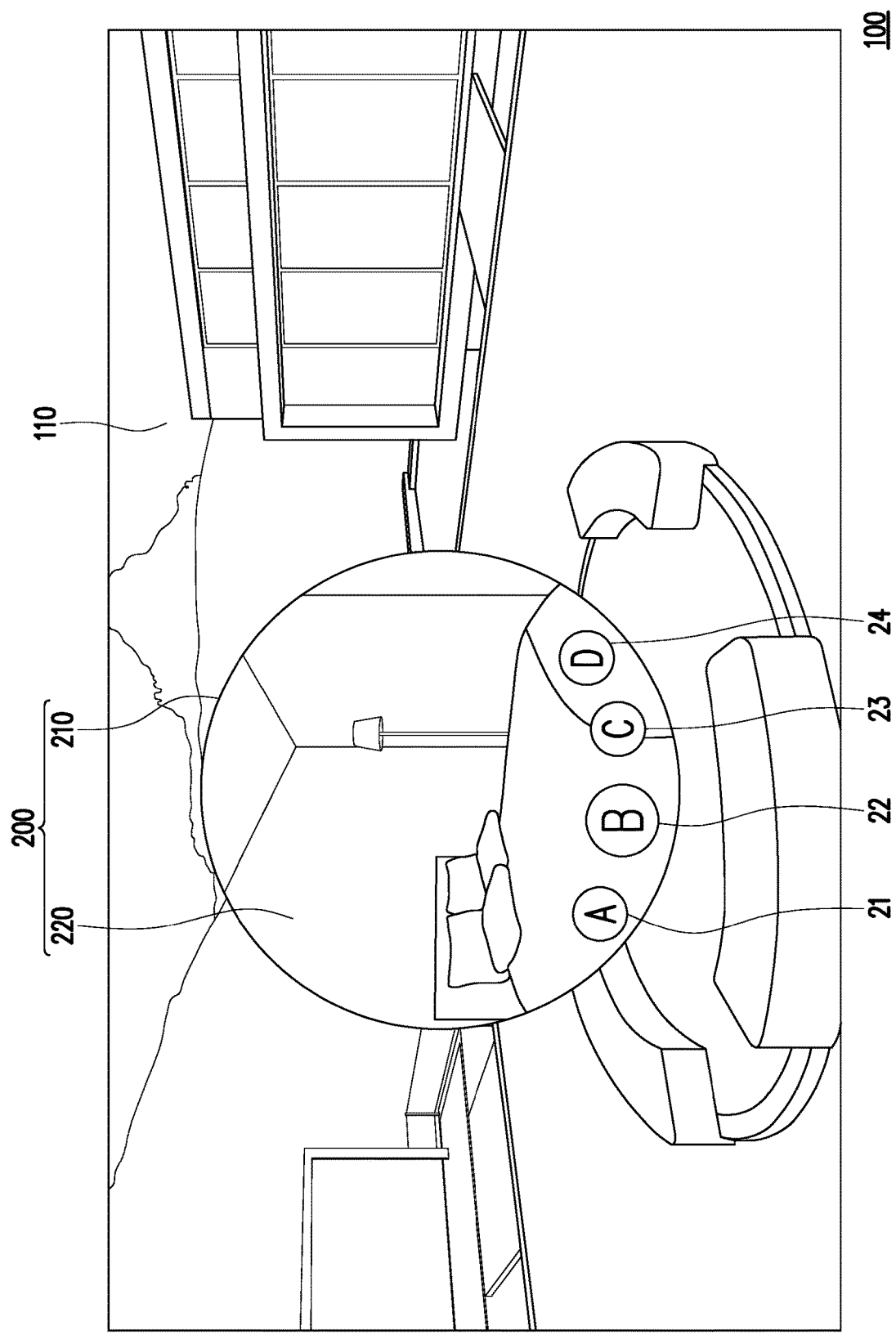
FIG. 3 illustrates a schematic diagram of the portal not associated with any of the virtual scenes according to one embodiment of the present invention.

FIG. 3 illustrates a schematic diagram of the portal 200 not associated with any of the virtual scenes (i.e., the portal 200 is not dedicated to a specific virtual scene) according to one embodiment of the present invention. The processor 11 may determine whether the portal 200 is associated with any of the virtual scenes. If the processor 11 determines that the portal 200 is not associated with any of the virtual scenes, the processor 11 may display the portal 200 in the virtual scene 110 with a plurality of elements respectively corresponding to different virtual scenes, wherein an element may be a user-interactable object in the virtual scene. Accordingly, the processor 11 may make the portal 200 be associated with a plurality of virtual scenes respectively corresponding to the plurality of elements. For example, the processor 11 may display the portal 200 in the virtual scene 110 with an element 21 corresponding to the "scene A", an element 22 corresponding to the "scene B", an element 23 corresponding to the "scene C", and the element 24 corresponding to the "scene D", as shown in FIG. 3. However, if the processor 11 determines that the portal 200 is associated with a specific virtual scene, the processor 11 may display the portal 200 in the virtual scene 110 without the plurality of elements (e.g., element 21, 22, 23, or 24), as shown in FIG. 2.

If the processor 11 receives a command for selecting an element, the processor 11 may display a preview image of the corresponding virtual scene on the preview area 220 in the portal 200. Furthermore, if the processor 11 receives a command corresponding to the selected element, the processor 11 may switch the VR environment 100 from the virtual scene 110 to the virtual scene corresponding to the selected element. For example, it is assumed that the element 22 is corresponding to the "scene B", wherein the "scene B" is associated with the "virtual room". If the processor 11 receives, via the transceiver 13, a command for selecting the element 22, the size of the element 22 may be enlarged by the processor 11, and the processor 11 may start to display the preview image of the "virtual room" on the preview area 220. If the processor 11 receives, via the transceiver 13, a command corresponding to the selected element 22, the processor 11 may switch the VR environment 100 form the virtual scene 110 to the virtual scene associated with the element 22.

Figure 4:
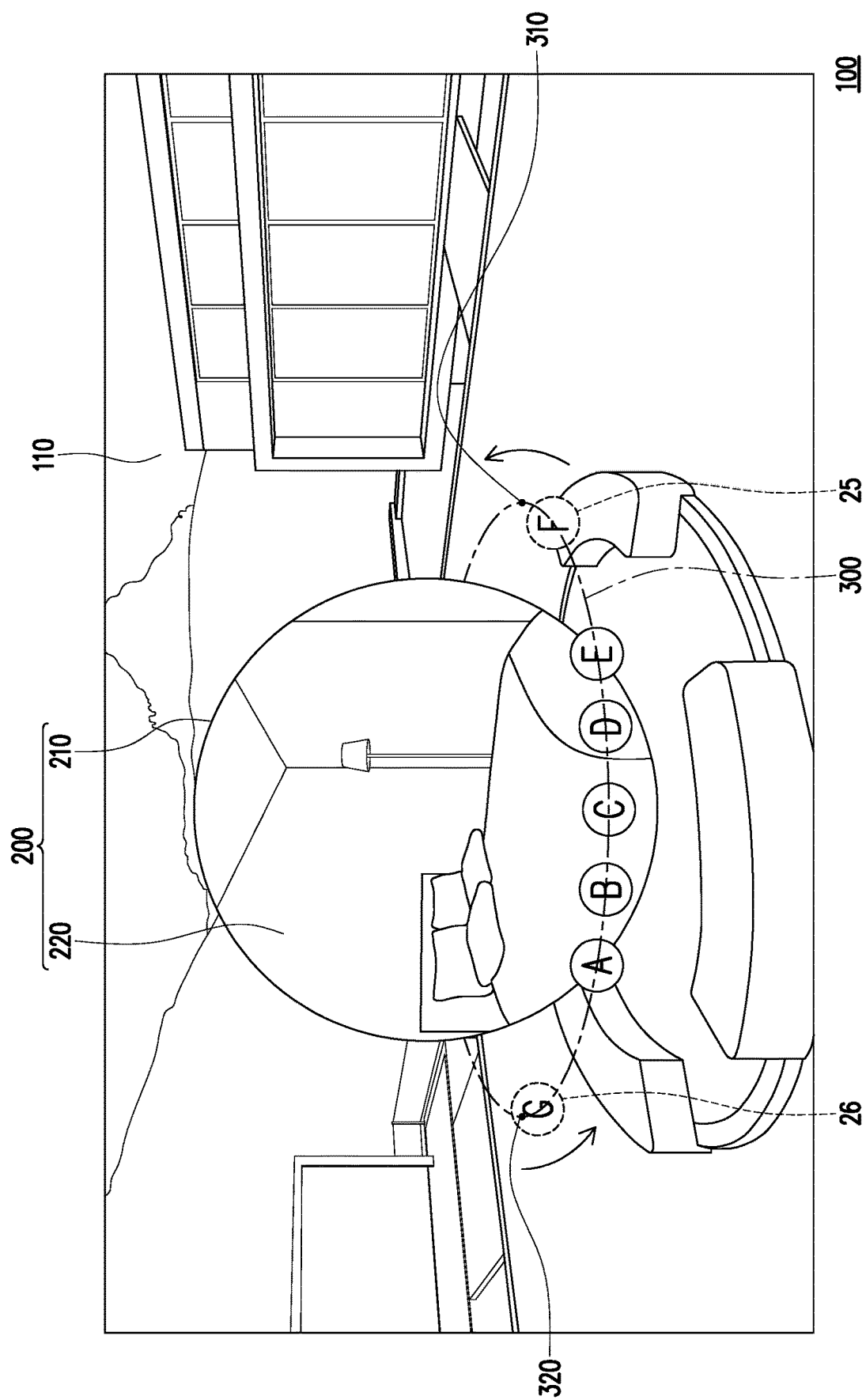
FIG. 4 illustrates a schematic diagram of the motion of the plurality of elements according to one embodiment of the present invention.

In one embodiment, if the number of the plurality of elements of the portal 200 is too many, the processor 11 may display only a part of the plurality of elements in the virtual scene 110 and hide the other part of the plurality of elements temporarily. The displayed elements may disappear or the hidden elements may appear according to a swipe operation. FIG. 4 illustrates a schematic diagram of the motion of the plurality of elements according to one embodiment of the present invention. The virtual scene 110 may include a trajectory 300. The trajectory 300 may be visible or invisible. For example, the trajectory 300 may be invisible. For example, the trajectory 300 may be invisible when the user is not interacting with the portal 200. However, the trajectory 300 may become visible when the user is interacting with the portal 200 (e.g., performing a swipe operation on the elements of the portal 200). In one embodiment, the trajectory 300 may surround the portal 200. Since the number of the elements of the portal 200 is too many, some of the elements may be hidden by the processor 11. For example, the element 26 corresponding to the "scene G" may be removed from the VR environment 100 by the processor 11. Only the elements respectively corresponding to "scene A", "scene B", "scene C", "scene D", "scene E", and "scene F" are displayed in the virtual scene 110 by the processor 11.

The plurality of elements may be moved along the trajectory 300. In one embodiment, the plurality of elements may be moved along the trajectory 300 manually. For example, if the processor 11 receives, via the transceiver 13, a user's swipe operation on the plurality of elements, the processor 11 may move the plurality of elements along the trajectory 300 according to the swipe operation. In one embodiment, the plurality of elements may be moved along the trajectory automatically. For example, the processor 11 may move the plurality of elements along the trajectory 300 according to a trigger event such as the portal 200 being displayed, the portal 200 being manipulated or the virtual scene 110 not interacting with the user for a period of time. The processor 11 may remove an element from the VR environment 100 if the elements is moved to the position 310 of the trajectory 300. That is, the element will disappear from the virtual scene 110. For example, the element 25 may be moved along the trajectory 300 based on a swipe operation. When the element 25 reaches the position 310 of the trajectory 300, the processor 11 may remove the element 25 from the VR environment 100.

In one embodiment, the processor 11 may add an additional element to the plurality of displayed elements in response to an element being removed from the VR environment 100, wherein the additional element may appear in the virtual scene 110 through the position 320 of the trajectory 300. For example, the processor 11 may add the element 26 (i.e., element corresponding to "scene G") to the plurality of displayed elements (i.e., elements respectively corresponding to "scene A", "scene B", "scene C", "scene D", and "scene E"). The element 26 may appear in the virtual scene 110 through the position 320, as shown in FIG. 4. In one embodiment, the processor 11 may show an indication (e.g., a dotted circle) indicating the locations of the position 310 or position 320 in the virtual scene 110 in response to receiving the swipe operation. If the swipe operation is not received by the processor 10, the indication of the position 310 or position 320 may be hidden by the processor 11. That is, the user exploring the VR environment 100 may not see the indication of the position 310 or position 320 in the virtual scene 110.

In one embodiment, the processor 11 may adjust a transparency of an element if the element is moved toward the position 310 of the trajectory 300. More specifically, if a distance between an element and the position 310 is less than a threshold, the processor 11 may increase the transparency of the element in response to the element being moved toward the position 310. That is, the closer the element is to the position 310, the more transparent the element is. For example, the processor 11 may increase the transparency of the element 25 if the element 25 is moved toward the position 310 by the swipe operation. Ultimately, the processor 11 may remove the element 25 from the VR environment 100 if the element 25 reaches the position 310.

In one embodiment, the processor 11 may adjust a transparency of an element if the element is moved away from the position 320 of the trajectory 300. More specifically, if a distance between an element and the position 320 is greater than a threshold, the processor 11 may decrease the transparency of the element in response to the element being moved away from the position 320. That is, the closer the element is to the position 320, the more transparent the element is. For example, the processor 11 may decrease the transparency of the element 26 if the element 26 is moved away from the position 320 by the swipe operation.

Figure 5:
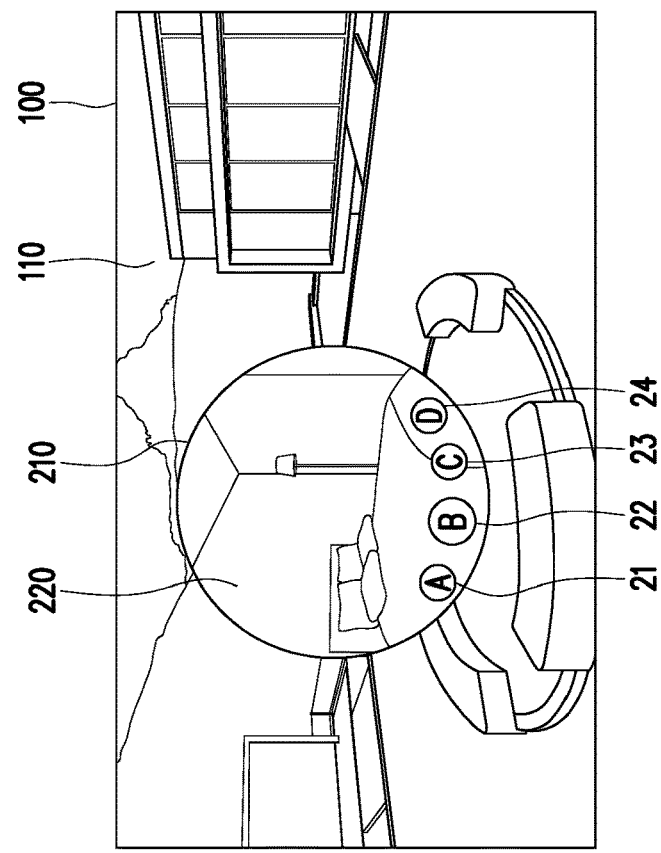
FIG. 5 illustrates a schematic diagram the appearance of the preview image of the virtual scene according to one embodiment of the present invention.
Figure 5:
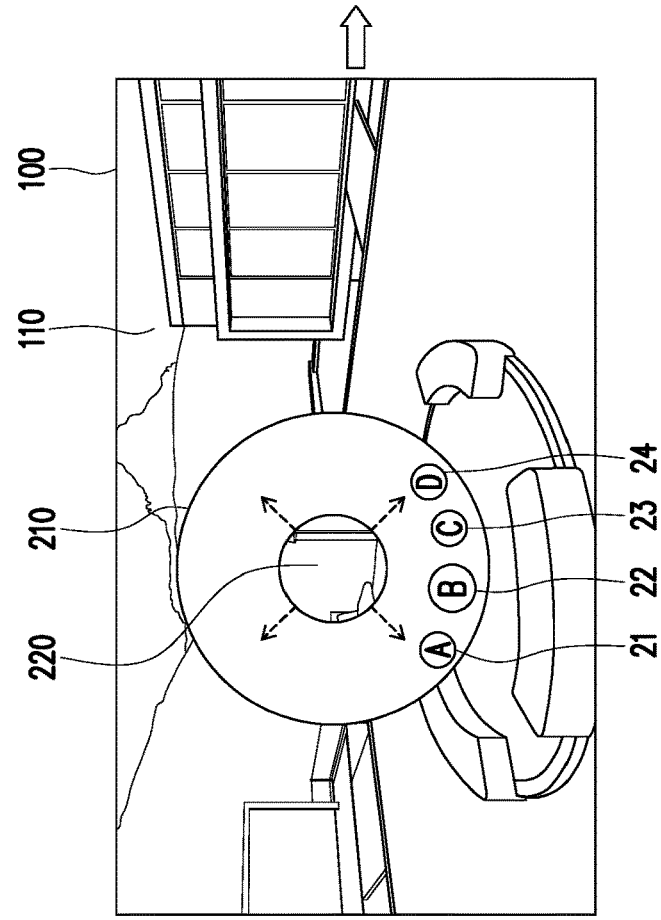

In one embodiment, after the preview area 220 of the portal 200 is displayed in the virtual scene 110 by the processor 11, the size of the preview area 220 may grow over time. FIG. 5 illustrates a schematic diagram the appearance of the preview image of the virtual scene according to one embodiment of the present invention. After the element 22 being selected by the user, the processor 11 may display a preview image corresponding to the element 22 (e.g., preview image of a "virtual room") in the preview area 220. At first, the preview area 220 may be just a little point in the center of the portal 200. The preview image in the preview area 220 is difficult to see by the user since the part of the preview image be displayed is too small. Over time, the size of the preview area 220 may be enlarged by the processor 11, and the preview image in the preview area 220 becomes clearer to the user exploring the VR environment 100, as shown in the right side of FIG. 5.

Figure 6:
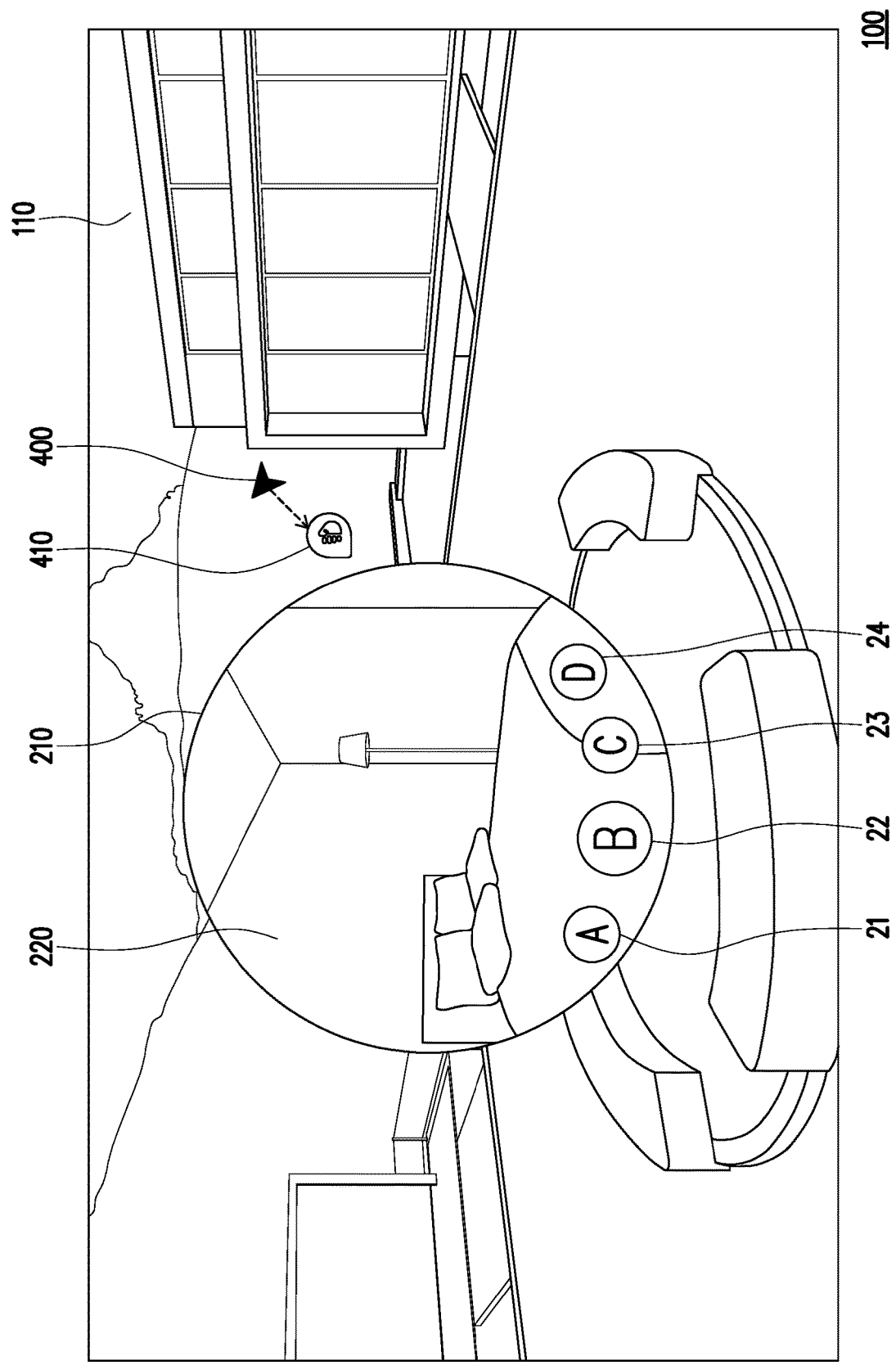
FIG. 6 illustrates a schematic diagram of the hint icon according to one embodiment of the present invention.

FIG. 6 illustrates a schematic diagram of the hint icon 410 according to one embodiment of the present invention. The processor 11 may receive a user operation via the transceiver 13, wherein the user operation may correspond to a coordinate in the virtual scene 110. The processor 11 may show a cursor 400 on the coordinate in the virtual scene 110, as shown in FIG. 6. The user operation received by the processor 11 may move the cursor 400 in the virtual scene 110 such that the user may interact with the user-interactable object in the virtual scene 110. In one embodiment, the cursor 400 may represent an indicator of a handheld device (e.g., a VR controller of the HMD) holding by the user, wherein the handheld device may communicatively connect to the transceiver 130. The processor 11 may determine a distance between the frame 210 and the coordinate of the cursor 400. If the distance between the frame 210 and the coordinate of the cursor 400 is less than a threshold, the processor 11 may show a hint icon 410 in the virtual scene on the coordinate of the cursor 400. In other words, the cursor 400 may be replaced by the hint icon 410 if the cursor 400 is too close to the frame 210.

Figure 7:
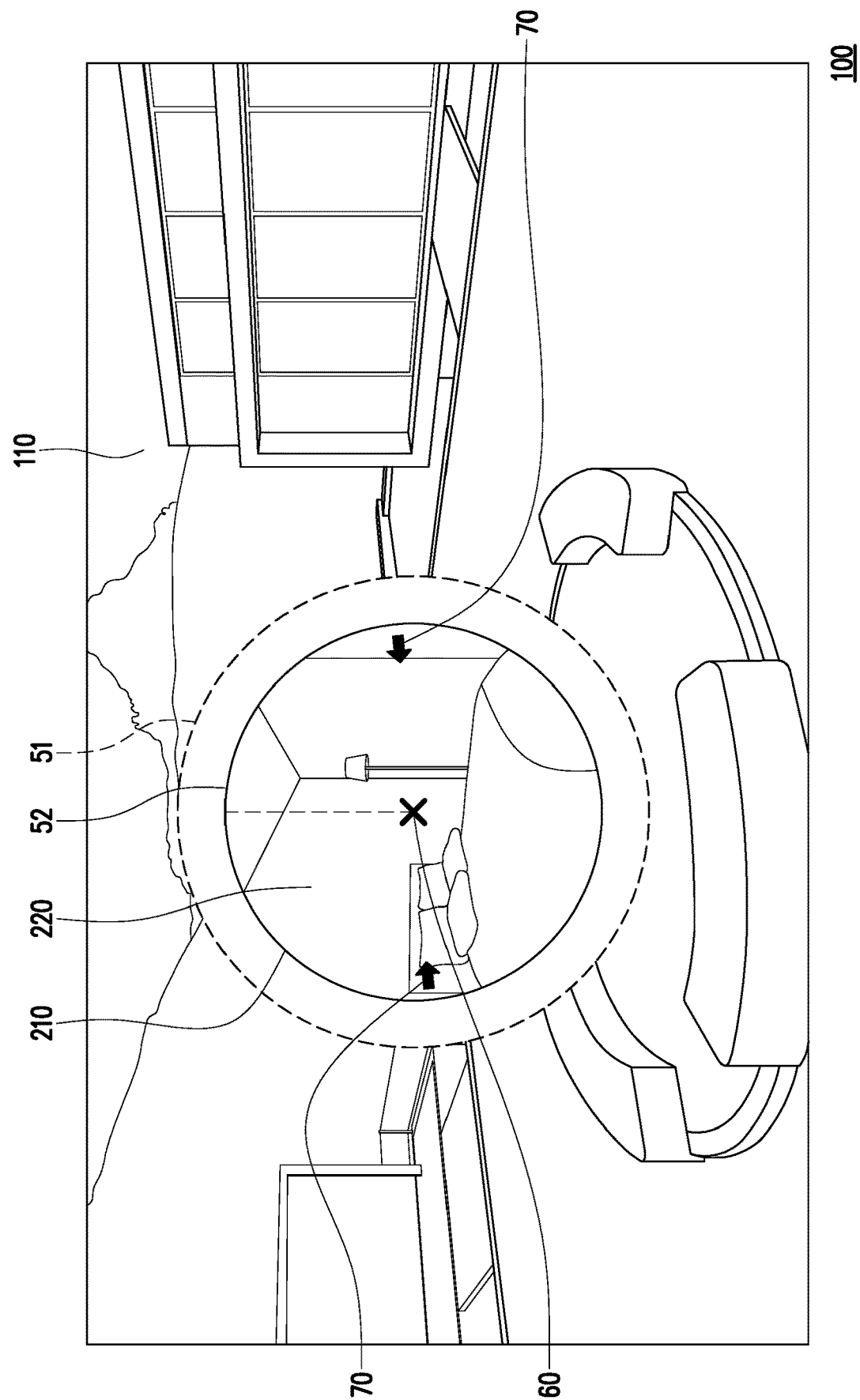
FIG. 7 illustrates a schematic diagram of the dragging the frame of the portal according to one embodiment of the present invention.

FIG. 7 illustrates a schematic diagram of the dragging the frame 210 of the portal 200 according to one embodiment of the present invention. When the cursor 400 is close enough to the frame 210 and is replaced by the hint icon 410, the processor 11 may drag the frame 210 of the portal 200 according to a user's drag operation received by the processor 11. The drag operation may include a two hands gesture detected by a camera of an HMD supporting the hand gesture tracking technology, or the drag operation may include a detection result of a handheld device (e.g., two hands VR controller) holding by the user, wherein the handheld device may include an inertial measurement unit (IMU) for detecting the motion of the user's hand. The processor 11 may determine whether the frame 210 is dragged toward a center 60 of the portal 200. More specifically, after the frame 210 being dragged, the processor 11 may release the frame 210 from being dragged if the processor 11 receives another user's release operation via the transceiver 13. The processor 11 may further determine a distance (represented by the dotted line) between the dragged frame 210 and the center 60 in response to the frame 210 being released from being dragged. If the processor 11 determines the distance between the frame 210 and the center is less than a threshold (i.e., the frame 210 is dragged close enough to the center 60), the processor 11 may determine the frame is dragged toward the center 60. On the other hand, if the processor 11 determines the distance between the frame 210 and the center 60 is greater than or equal to the threshold, the processor 11 may determine the frame 210 is not dragged toward the center 60.

Take FIG. 7 as an example, it is assumed that the frame 210 is at an original position—position 51 before being dragged, and the frame 210 at a current position—position 52 after being dragged. The processor 11 may determine whether the frame 210 is dragged toward the center 60 according to the distance between the position 52 (i.e., the current position of the frame 210) and the center 60. If the distance between the position 52 and the center 60 is less than a threshold, the processor 11 may determine the frame 210 is dragged toward the center 60. If the distance between the position 52 and the center 60 is greater than or equal to the threshold, the processor 11 may determine the frame 210 is not dragged toward the center 60. The processor 11 may remove the portal 200 from the VR environment 100 in response to determining the frame 210 is dragged toward the center 60. That is, the processor 11 may close the portal 200 in the virtual scene 110. Accordingly, the portal 200 may disappear from the virtual scene 110. In one embodiment, the distance between the position 52 and the center 60 may be determined in response to the dragged frame 210 being released by the user (i.e., the user's drag operation being stop) at the position 52. That is, the processor 11 may remove the portal 200 only if the dragged frame 210 being released by the user. If the dragged frame 210 is not released by the user, the processor 11 may not determine the distance between the position 52 (i.e., current position of the frame 210) and the center 60. Therefore, the processor 11 may not determine that the frame 210 is dragged toward the center 60.

Figure 8:
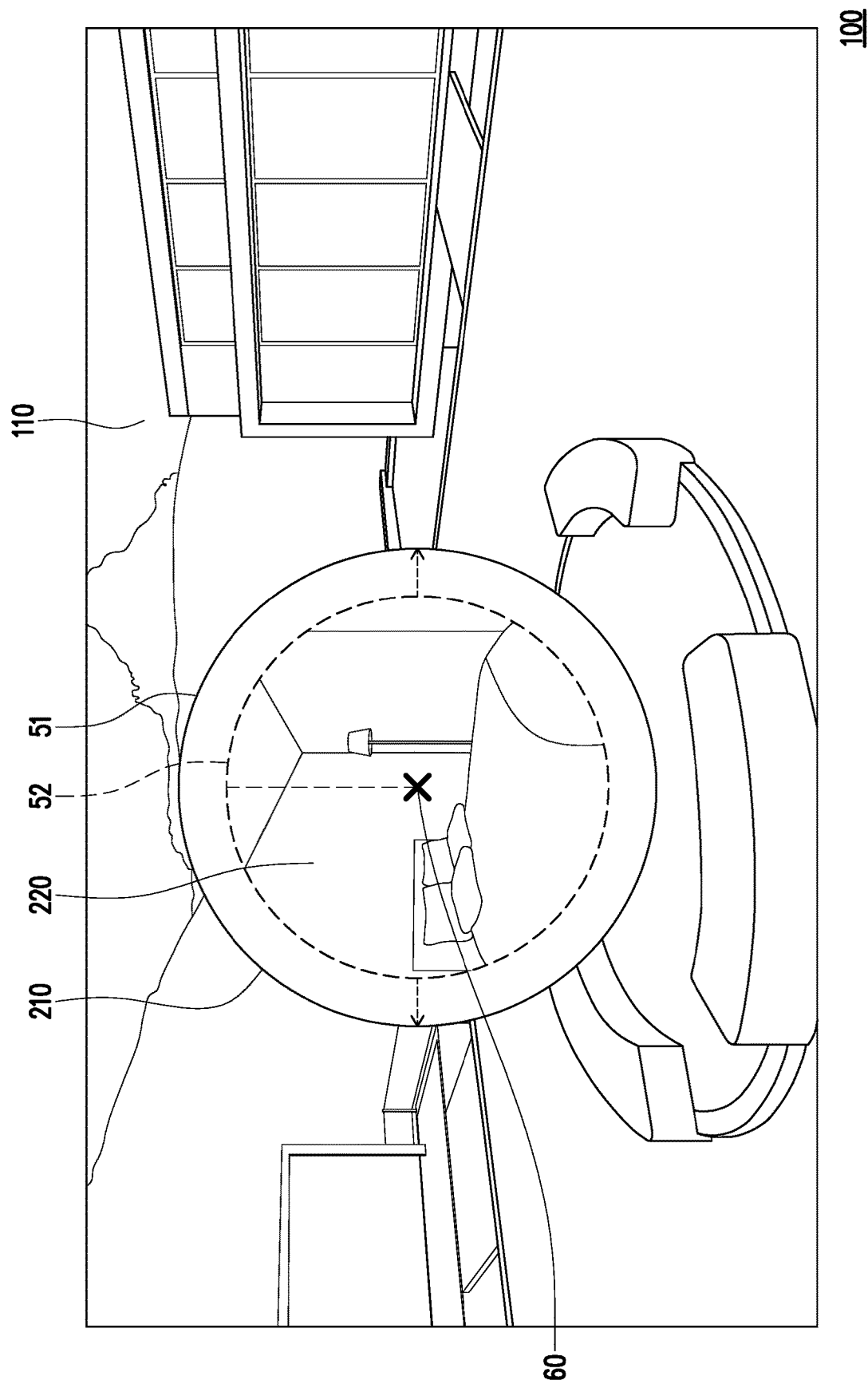
FIG. 8 illustrates a schematic diagram of restoring the position of the frame according to one embodiment of the present invention.

On the other hand, the processor 11 may restore frame 210 from the current position back to the original position in response to determining the frame 210 is not dragged toward the center 60. FIG. 8 illustrates a schematic diagram of restoring the position of the frame 210 according to one embodiment of the present invention. If the processor 11 determines the frame 210 is not dragged toward the center 60, the processor 11 may restore the frame 210 from the position 52 (i.e., the current position of the frame 210) back to the position 51 (i.e., the original position of the frame 210).

In one embodiment, the processor 11 may display a hint image 70 on the preview area 220 of the portal 200 in response to determining the frame 210 is dragged, wherein the hint image 70 prompts the user how to drag the frame 210 to close the portal 200. For example, the hint image 70 may include one or more arrows pointing to the center 60, as shown in FIG. 7.

Figure 9:
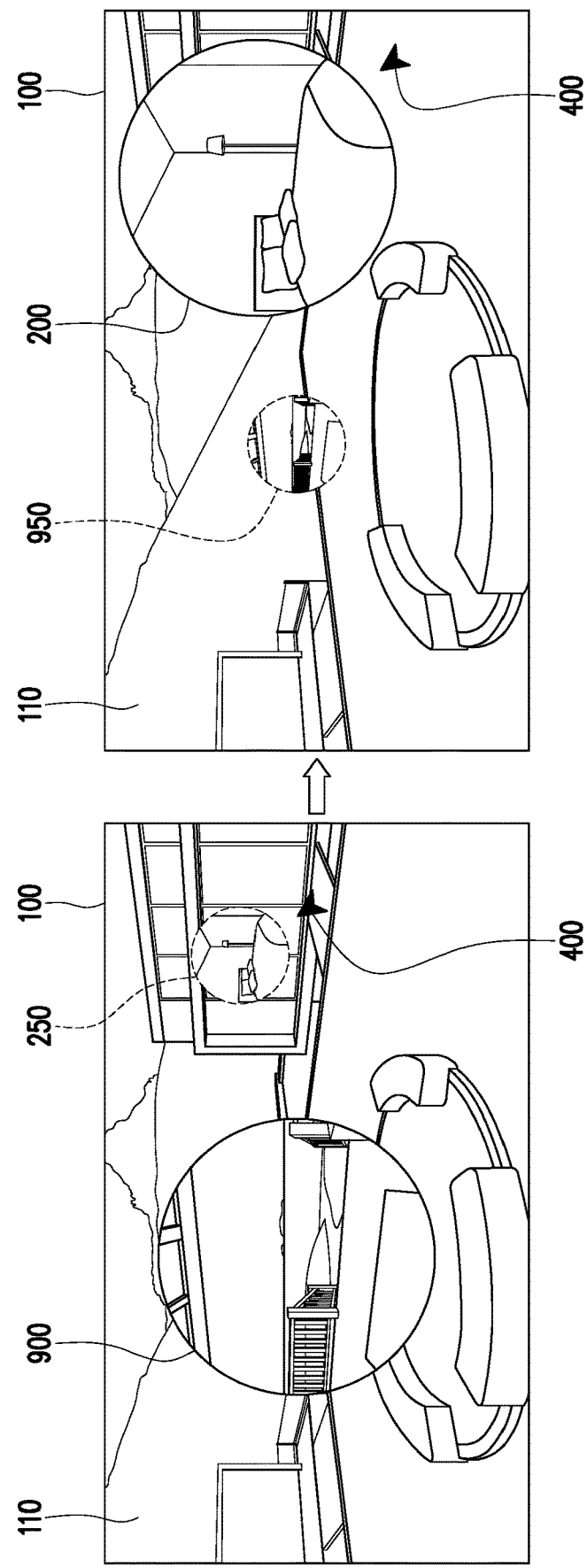
FIG. 9 illustrates a schematic diagram of portal selection according to one embodiment of the present invention.

In one embodiment, a plurality of portals may be included in one virtual scene for user to select. FIG. 9 illustrates a schematic diagram of portal selection according to one embodiment of the present invention. It is assumed that a portal 900 is displayed in the virtual scene 110, wherein the virtual scene 110 may include a user-interactable object 250 corresponding to the portal 200. The size of the user-interactable object 250 may be smaller than the size of the portal 200. The processor 11 may detect, via the transceiver 13, a user operation corresponding to the user-interactable object 250. The processor 11 may remove the portal 900 from the virtual scene 110 (i.e., make the portal 900 disappear from the virtual scene 110) and display the portal 200 in the virtual scene 110 according to the user operation. The processor 11 may further display a user-interactable object 950 corresponding to the portal 900 in the virtual scene 110, wherein the size of the user-interactable object 950 may be smaller than the size of the portal 900. In other words, the virtual scene 110 may include a plurality of user-interactable objects respectively corresponding to a plurality of portals. The processor 11 may open one of the plurality of portals (i.e., displaying the portal in the virtual scene 110) if the corresponding user-interactable object is selected by the user. The other portals not selected by the user may be represented in the virtual scene 110 in the form of user-interactable objects.

Figure 10:
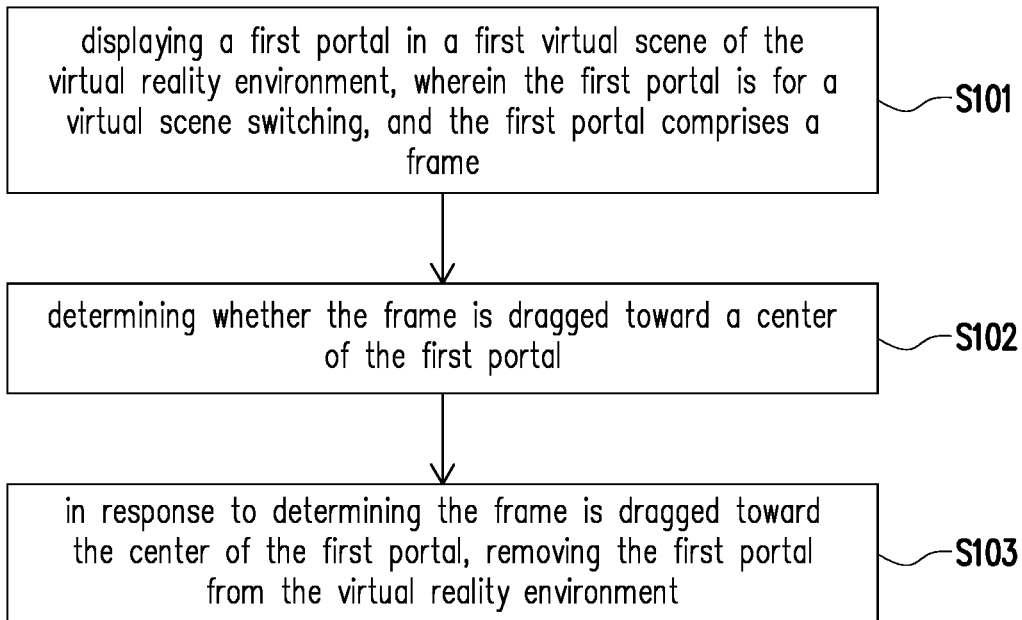
FIG. 10 illustrates a flowchart of a method for interacting with a VR environment according to one embodiment of the present invention.

FIG. 10 illustrates a flowchart of a method for interacting with a VR environment according to one embodiment of the present invention, wherein the method can be implemented by the electronic device 10 as shown in FIG. 1. In step S101, displaying a first portal in a first virtual scene of the virtual reality environment, wherein the first portal is for a virtual scene switching, and the first portal comprises a frame. In step S102, determining whether the frame is dragged toward a center of the first portal. In step S103, in response to determining the frame is dragged toward the center of the first portal, removing the first portal from the virtual reality environment.

Figure 11:
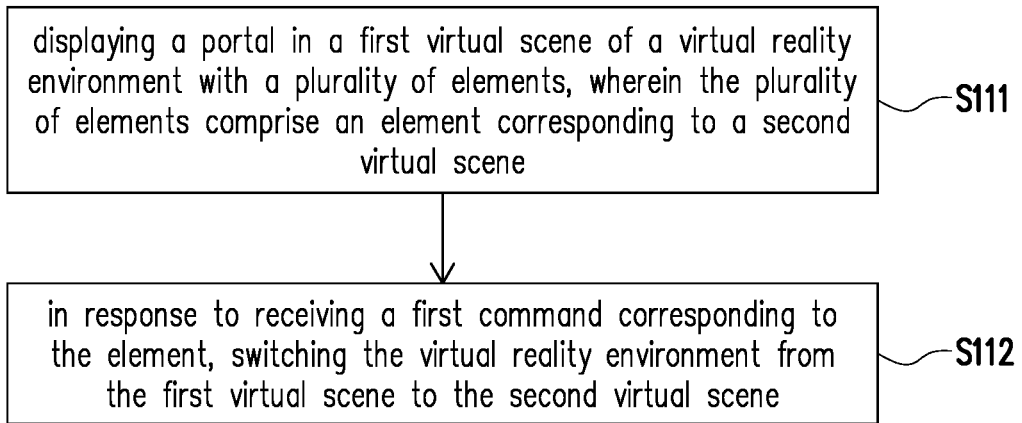
FIG. 11 illustrates a flowchart of a method for destination selection of virtual scenes according to one embodiment of the present invention.

FIG. 11 illustrates a flowchart of a method for destination selection of virtual scenes according to one embodiment of the present invention, wherein the method can be implemented by the electronic device 10 as shown in FIG. 1. In step S111, displaying a portal in a first virtual scene of a virtual reality environment with a plurality of elements, wherein the plurality of elements comprise an element corresponding to a second virtual scene. In step S112, in response to receiving a first command corresponding to the element, switching the virtual reality environment from the first virtual scene to the second virtual scene.

In summary, the method of the present invention may provide a portal in a virtual scene for the user, wherein the user may switch the VR environment from a virtual scene to another virtual scene by interacting with the portal. The portal may include a plurality of elements respectively representing different virtual scenes. A virtual scene may show a specific number of the plurality of elements, wherein the plurality of elements may move along a trajectory. If the number of the elements is too many, some elements may be hidden from the virtual scene. The hidden elements may be shown in the virtual scene based on a swipe operation of the user. The user may select a destination from the plurality of virtual scenes. However, if the user decides not to switch the virtual scene, the user may remove the portal from the VR environment by dragging a frame of the portal toward a center of the portal. The present invention provides a convenience way for the user to select a virtual scene, switch the VR environment from one virtual scene to another one, display a plurality of elements respectively corresponding to different virtual scenes, or remove the portal from the VR environment. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for interacting with a virtual reality environment, comprising:

displaying a first portal in a first virtual scene of the virtual reality environment, wherein the first portal is for a virtual scene switching, and the first portal comprises a frame;

determining whether the frame is dragged toward a center of the first portal, comprising: in response to the frame being released from being dragged, determining a distance between the frame and the center; and in response to determining the distance being greater than or equal to a threshold, determining the frame is not dragged toward the center, wherein the frame is at an original position in the first virtual scene before being dragged;

in response to determining the frame is dragged toward the center of the first portal, removing the first portal from the virtual reality environment; and in response to determining the frame is not dragged toward the center, restoring the frame from a current position back to the original position.

2. The method of claim 1, wherein the step of determining whether the frame is dragged toward the center of the first portal further comprising:

in response to determining the distance being less than the threshold, determining the frame is dragged toward the center.

3. The method of claim 1, further comprising:

determining a second distance between the frame and a coordinate corresponding to a user operation; and in response to determining the second distance being less than a second threshold, showing a hint icon in the first virtual scene.

4. The method of claim 3, further comprising:

showing a cursor on the coordinate in the first virtual scene.

5. The method of claim 1, further comprising:

in response to determining the frame is dragged, displaying a hint image on a preview area in the first portal.

6. The method of claim 1, further comprising:

displaying a second portal in the first virtual scene, wherein the first virtual scene comprises a user-interactable object corresponding to the first portal;

detecting a user operation corresponding to the user-interactable object; and removing the second portal from the first virtual scene and displaying the first portal in the first virtual scene according to the user operation.

7. The method of claim 1, further comprising:

in response to receiving a command corresponding to the first portal, switching the virtual reality environment from the first virtual scene to a second virtual scene.

8. The method of claim 1, wherein the first portal is a graphical user interface.

9. The electronic device of claim 1, wherein the processor further configured to:

in response to receiving a command corresponding to the first portal via the transceiver, switch the virtual reality environment from the first virtual scene to a second virtual scene.

10. An electronic device for interacting with a virtual reality environment, comprising:

a transceiver, outputting a first virtual scene of the virtual reality environment; and a processor coupled to the transceiver, wherein the processor is configured to:

display a first portal in the first virtual scene, wherein the first portal is for a virtual scene switching, and the first portal comprises a frame;

determine whether the frame is dragged toward a center of the first portal by: determining a distance between the frame and the center in response to the frame being released from being dragged; and determining the frame is not dragged toward the center in response to determining the distance being greater than or equal to a threshold, wherein the frame is at an original position in the first virtual scene before being dragged;

in response to determining the frame is dragged toward the center of the first portal, remove the first portal from the virtual reality environment; and in response to determining the frame is not dragged toward the center, restore the frame from a current position back to the original position.

11. The electronic device of claim 10, wherein the processor further configured to:

in response to determining the distance being less than the threshold, determine the frame is dragged toward the center.

12. The electronic device of claim 10, wherein the processor further configured to:

determine a second distance between the frame and a coordinate corresponding to a user operation; and in response to determining the second distance being less than or equal to a second threshold, show a hint icon in the first virtual scene.

13. The electronic device of claim 12, wherein the processor further configured to:

show a cursor on the coordinate in the first virtual scene.

14. The electronic device of claim 10, wherein the processor further configured to:

in response to determine the frame is dragged, display a hint image on a preview area in the first portal.

15. The electronic device of claim 10, wherein the processor further configured to:

display a second portal in the first virtual scene, wherein the first virtual scene comprises a user-interactable object corresponding to the first portal;

detect a user operation on the user-interactable object; and remove the second portal from the first virtual scene and display the first portal in the first virtual scene according to the user operation.

16. A non-transitory computer readable storage medium for interacting with a virtual reality environment, recording an executable computer program to be loaded by an electronic device to execute steps of:

displaying a first portal in a first virtual scene of the virtual reality environment, wherein the first portal is for a virtual scene switching, and the first portal comprises a frame;

determining whether the frame is dragged toward a center of the first portal, comprising: in response to the frame being released from being dragged, determining a distance between the frame and the center; and in response to determining the distance being greater than or equal to a threshold, determining the frame is not dragged toward the center, wherein the frame is at an original position in the first virtual scene before being dragged;

in response to determining the frame is dragged toward the center of the first portal, removing the first portal from the virtual reality environment; and in response to determining the frame is not dragged toward the center, restoring the frame from a current position back to the original position.

* * * * *